United States Patent
Polarine et al.

(10) Patent No.: US 7,822,845 B2
(45) Date of Patent: *Oct. 26, 2010

(54) MONITORING DEVICE USED FOR PRODUCING COMPOSITIONS

(75) Inventors: Christine Darlene Ames Polarine, Spring City, PA (US); James D. Goldschneider, Newark, DE (US); John Paul Gallagher, Hockessin, DE (US); Robert Vincent Canning, Jr., Bear, DE (US); James Fredrick MacFawn, Philadelphia, PA (US)

(73) Assignee: E. I. du Pont de Nemours & Co., Wilmington, DE (US)

( * ) Notice: Subject to any disclaimer, the term of this patent is extended or adjusted under 35 U.S.C. 154(b) by 1501 days.

This patent is subject to a terminal disclaimer.

(21) Appl. No.: 11/025,521

(22) Filed: Dec. 29, 2004

(65) Prior Publication Data

US 2005/0203941 A1 Sep. 15, 2005

(51) Int. Cl.
 *G06F 15/173* (2006.01)
(52) U.S. Cl. ..................................... 709/224
(58) Field of Classification Search ................. 709/224
See application file for complete search history.

(56) References Cited

U.S. PATENT DOCUMENTS

| | | | |
|---|---|---|---|
| 4,403,866 A | | 9/1983 | Falcoff et al. |
| 5,023,814 A | | 6/1991 | Guillemin |
| 5,153,825 A | | 10/1992 | Yauk et al. |
| 5,163,484 A | * | 11/1992 | Howlett et al. .............. 141/9 |
| 5,240,324 A | | 8/1993 | Phillips et al. |
| 5,636,118 A | * | 6/1997 | Brewster et al. .............. 705/29 |
| 5,819,232 A | * | 10/1998 | Shipman ..................... 705/8 |
| 5,853,244 A | * | 12/1998 | Hoff et al. ................... 366/141 |
| 5,887,975 A | | 3/1999 | Mordaunt et al. |
| 6,203,183 B1 | | 3/2001 | Mordaunt et al. |
| RE37,956 E | | 1/2003 | Blama |
| 6,539,325 B1 | | 3/2003 | Numata et al. |
| 6,600,418 B2 | | 7/2003 | Francis et al. |
| 6,637,926 B1 | | 10/2003 | Auad |
| 6,924,817 B2 | | 8/2005 | Rice et al. |
| 7,093,756 B2 | | 8/2006 | Muehl et al. |

(Continued)

FOREIGN PATENT DOCUMENTS

WO    WO 01/90258    11/2001

(Continued)

*Primary Examiner*—Thu Nguyen
*Assistant Examiner*—Brian P Whipple
(74) *Attorney, Agent, or Firm*—Sudhir G. Deshmukh

(57) ABSTRACT

The present invention is directed to a monitoring device for producing a target composition, such as an automotive paint or an architectural paint. The device includes a client computer in communication with a host computer and means for dispensing required items for making a desired amount of the target composition. The computer readable program code means in the computers identify one or more formulas associated with identification criteria of the target composition and dispense through means for dispensing the required items listed in the formula. The code means search for the required items in the various inventories, including updating the inventories if required. The device can be also used to control the inventory by shipping just in time any components required to produce target compositions, such as refinish tints used in automotive refinish paints.

19 Claims, 13 Drawing Sheets

U.S. PATENT DOCUMENTS

| | | | |
|---|---|---|---|
| 7,171,377 B2 * | 1/2007 | Ogasawara | 705/22 |
| 2001/0018671 A1 * | 8/2001 | Ogasawara | 705/26 |
| 2002/0077979 A1 * | 6/2002 | Nagata | 705/40 |
| 2003/0177069 A1 * | 9/2003 | Joseph | 705/22 |
| 2003/0216969 A1 * | 11/2003 | Bauer et al. | 705/22 |
| 2004/0084520 A1 | 5/2004 | Muehl et al. | |
| 2004/0225732 A1 * | 11/2004 | Coons et al. | 709/224 |
| 2005/0038557 A1 | 2/2005 | Friel et al. | |
| 2005/0156036 A1 | 7/2005 | Polarine | |
| 2005/0160077 A1 | 7/2005 | Howes | |

FOREIGN PATENT DOCUMENTS

| | | |
|---|---|---|
| WO | WO 02/00335 | 1/2002 |
| WO | WO 02/073142 | 9/2002 |
| WO | WO 03/084653 | 10/2003 |

\* cited by examiner

Means for configuring computer readable program code devices to cause said computer to receive (a) stock composition information on stock composition identification tags read by one or more identification tag interrogators, said stock composition identification tags being affixed to stock composition containers that contain said stock composition, (b) stock component information on stock components identification tags read by said identification tag interrogators, said stock components identification tags being affixed to stock component containers that match said target components, (c) additional stock composition information on additional stock composition identification tags read by said identification tag interrogators, said additional stock compostion identification tags being affixed to additional stock composition containers that contain said stock composition, and (d) missing stock component information on missing stock components identification tags read by said identification tag interrogators, said missing stock components identification tags being affixed to missing stock component containers.

MONITORING DEVICE USED FOR PRODUCING COMPOSITIONS

FIELD OF INVENTION

The present invention is directed to monitoring production of compositions and more particularly directed to monitoring paint cans and paints contained therein during their life cycle.

BACKGROUND OF INVENTION

During the production of compositions, such as automotive paints, several components are mixed in a certain desired proportion to produce a composition. For example paint shop users visually match the required color to a color reference chip from a color reference chip manual supplied by Du Pont Company, Wilmington, Del., which also provides the manufacturer's paint code. Alternatively, the paint shops can use a software tool called Vindicator® locator software supplied by DuPont Company to locate the VIN number/manufacturer's paint code, and then translate it to a DuPont formula code. However, these paint codes still need to be matched to a color formula. Once the formula that matches the paint code is found, components in quantities listed in the formula are manually poured into a receiving container positioned on a stand-alone scale. Typically, no data are kept for future use and no inventory of dispensed components is maintained. Some shops use semi-automated dispensing systems, such as a dispenser connected to the ColorNet® PC dispensing system supplied by YADA Systems, Roseville, Minn. The user manually weighs-out component quantities in accordance with a formula. The quantities of dispensed components are recorded in a database. If the dispensed quantities are above a present acceptable tolerance, the dispensing system can recalculate the component quantities to bring the batch back into an acceptable tolerance level. Printouts of the quantities of the dispensed components can be stored or printed out for future reference. Alternatively, some paint shops use X-Pert™ Paint Mixing System supplied by YADA Systems, Roseville, Minn. connected to ColorNet® PC dispensing system. The X-Pert™ System prompts the user to load a receiver, such as paint can, into a receiving fixture. The controller manipulates the fixture to dispense the correct amount of component. When that component has been dispensed, the next component is loaded in the fixture. The process is then repeated until all the components listed in the formula are dispensed. Resulting data are saved for later use.

A major problem associated with the forgoing systems is that these systems do not control the quality or types of components used in producing a target composition. As there is no monitoring of the dispensed components used to make the target composition, it is possible in the current processes to use inferior quality component or a wrong component. As result, it is not possible in the current processes to produce target compositions of desired predictable quality. The process of the present invention and the device used therein address the foregoing issue as well as provide means for monitoring the life cycle of the components, from the day they are produced by their manufacturer to the day they are dispensed by the user.

An object tracking and management system disclosed in U.S. Pat. No. 6,600,418 B2 utilizes radio frequency identification (RFID) tags to identify and move objects during the manufacturing process. However, need still exists to monitor production of compositions of desired quality.

STATEMENT OF INVENTION

The present invention is directed to a monitoring device comprising:

(A) a client computer usable storage medium located in a client computer, and a host computer usable storage medium located in a host computer in communication with said client computer; and (B) means for dispensing required items for making a desired amount of said target composition, said means for dispensing being in communication with said client computer, said host computer, or said client and said host computer;

wherein said client computer usable storage medium, host computer usable storage medium, or said client computer usable storage and said host computer usable storage media have computer readable program code means residing therein for monitoring production of a target composition, said computer readable program code means comprising:

(I) means for configuring computer readable program code devices to cause said client computer or said host computer to identify one or more formulas associated with identification criteria of said target composition, said formula providing a required inventory for making said desired amount of said target composition;

(II) means for configuring computer readable program code devices to cause said client computer or said host computer to generate a current inventory;

(III) means for configuring computer readable program code devices to cause said client computer or said host computer to terminate production of said target composition if said current inventory does not match with a stored inventory;

(IV) means for configuring computer readable program code devices to cause said client computer or said host computer to continue production of said target composition if said current inventory matches with said stored inventory;

(V) means for configuring computer readable program code devices to cause said client computer or said host computer to compare said current inventory against said required inventory to ascertain whether said current inventory fulfills said required inventory;

(VI) means for configuring computer readable program code devices to cause said client computer or said host computer to generate a supplementary inventory if said current inventory partially fulfills said required inventory;

(VII) means for configuring computer readable program code devices to cause said client computer or said host computer to dispense through said means for dispensing said required items listed in said required inventory from current items listed in said current inventory, supplementary items listed in said supplementary inventory, or a combination thereof to make said desired amount of said target composition; and (VIII) means for configuring computer readable program code devices to cause said client computer or said host computer to generate an updated inventory.

The present invention is also directed to a process for monitoring production of a target composition comprising:

(A) identifying one or more formulas associated with identification criteria of said target composition, said formula providing a required inventory for making a desired amount of said target composition;

(B) generating a current inventory;

(C) terminating said process if said current inventory does not match with a stored inventory; or (D) continuing said process if said current inventory matches with said stored inventory, said process further comprising:

(D1) comparing said current inventory against said required inventory to ascertain whether said current inventory fulfills said required inventory;

(D2) generating a supplementary inventory if said current inventory partially fulfills said required inventory;

(D3) dispensing required items listed in said required inventory from current items listed in said current inventory, supplementary items listed in said supplementary inventory, or a combination thereof to make said desired amount of said target composition; and (D4) generating an updated inventory.

The present invention is further directed to a process for monitoring production of a target composition comprising:

(A) entering identification criteria of said target composition on a client computer or on a host computer in communication with said client computer;

(B) searching a first database residing on said client computer or on said host computer for identifying one or more characteristics associated with said identification criteria;

(C) searching a second database residing on said client computer or said host computer for one or more formulas associated with said characteristics, said formula providing a required inventory for making a desired amount of said target composition;

(D) generating a current inventory;

(E) storing said current inventory on said client computer or on said host computer;

(F) terminating said process if said current inventory does not match with a stored inventory stored on said client computer or on said host computer; or (G) continuing said process if said current inventory matches with said stored inventory, said process further comprising:

(G1) comparing said current inventory against said required inventory to ascertain whether said current inventory fulfills said required inventory;

(G2) generating a supplementary inventory if said current inventory partially fulfills said required inventory wherein said supplementary inventory stored on said client computer or on said host computer;

(G3) dispensing required items listed in said required inventory from current items listed in said current inventory, supplementary items listed in said supplementary inventory, or a combination thereof to make said desired amount of said target composition;

(G4) generating an updated inventory; and (G5) storing said updated inventory on said client computer or on said host computer.

The present invention is still further directed to a process for monitoring production of a target composition comprising:

(A) receiving identification criteria of said target composition from a client computer in communication with a host computer;

(B) searching a first database for identifying one or more characteristics associated with said identification criteria, said first database residing on said host computer;

(C) searching a second database residing on said host computer for one or more said formulas associated with said characteristics, said formula providing a required inventory for making a desired amount of said target composition;

(D) receiving a current inventory from said client computer;

(E) terminating said process if said current inventory does not match with a stored inventory residing on said host computer; or (F) continuing said process if said current inventory matches with said stored inventory, said process further comprising:

(F1) comparing said current inventory against said required inventory to ascertain whether said current inventory fulfills said required inventory;

(F2) generating a supplementary inventory if said current inventory partially fulfills said required inventory wherein said supplementary inventory stored on said client computer or on said host computer;

(F3) dispensing required items listed in said required inventory from current items listed in said current inventory, supplementary items listed in said supplementary inventory, or a combination thereof to make said desired amount of said target composition;

(F4) generating an updated inventory; and (F5) storing said updated inventory on said client computer or on said host computer.

The present invention is further directed to a process for monitoring production of a target composition comprising:

(A) receiving identification criteria of said target composition from a client computer in communication with a host computer;

(B) searching a first database for identifying one or more characteristics associated with said identification criteria, said first database residing on said host computer;

(C) searching a second database residing on said host computer for one or more said formulas associated with said characteristics, said formula providing a required inventory for making a desired amount of said target composition;

(D) receiving a current inventory from said client computer;

(E) terminating said process if said current inventory does not match with a stored inventory residing on said host computer; or (F) continuing said process if said current inventory matches with said stored inventory, said process further comprising:

(F1) sending to said client computer said formulas;

(F2) receiving from said client computer an updated inventory; and (F3) storing said updated inventory on said host computer.

The present invention is also directed to a monitoring device comprising:

(A) a computer usable storage medium located in a computer; and (B) means for dispensing required items for making a desired amount of said target composition, said means for dispensing being in communication with said computer;

wherein said computer usable storage medium has computer readable program code means residing therein for monitoring production of a target composition, said computer readable program code comprising:

(I) means for configuring computer readable program code devices to cause said computer to identify one or more formulas associated with identification criteria of said target composition, said formula providing a required inventory for making said desired amount of said target composition;

(II) means for configuring computer readable program code devices to cause said computer to generate a current inventory;

(III) means for configuring computer readable program code devices to cause said computer to terminate production of said target composition if said current inventory does not match with a stored inventory;

(IV) means for configuring computer readable program code devices to cause said computer to continue production of said target composition if said current inventory matches with said stored inventory;

(V) means for configuring computer readable program code devices to cause said computer to compare said current inventory against said required inventory to ascertain whether said current inventory fulfills said required inventory;

(VI) means for configuring computer readable program code devices to cause said computer to generate a supplementary inventory if said current inventory partially fulfills said required inventory;

(VII) means for configuring computer readable program code devices to cause said computer to dispense through said means for dispensing said required items listed in said required inventory from current items listed in said current inventory, supplementary items listed in said supplementary inventory, or a combination thereof to make said desired amount of said target composition; and (VIII) means for configuring computer readable program code devices to cause said computer to generate an updated inventory.

BRIEF DESCRIPTION OF THE DRAWINGS

FIG. 9 provides further details of means for configuring computer readable program code devices to cause a standalone computer to generate a current inventory shown in FIG. 8A.

DETAILED DESCRIPTION OF PREFERRED THE EMBODIMENT

Compositions, such as automotive paints used in OEM (original equipment manufacturer) or refinish application, are typically prepared by mixing required items in quantities listed in one or more formulas. The required items are dispensed from current items in current inventory, such as one or more stock compositions that match a target composition, target components listed in the formulas, or a combination thereof. Sometimes, the current inventory may not have sufficient quantity of stock compositions required for making a desired quantity of the target composition, or a target component listed in the formula may be missing in the current inventory, or a combination thereof. Thus, supplementary items from a supplementary inventory may be required to augment the current inventory such that the required items can be dispensed to make the desired quantity of the target composition.

It should be understood that the term "composition" as used herein refers to compositions that include liquid components; solid components, such as powders, granules, or pellets that can be conveyed through conventional conveying means, such as pneumatic conveyers; or a mixture of liquid and solid components. Typical target compositions that can be produced by a device and the process of the present invention include OEM automotive paints, refinish automotive paints, architectural paints, industrial coating compositions, fragrances, dyes, printing inks, ink jet inks, lubricants, cements, nail polishes, flavors, food colorants, eye shadows, deodorants, shampoos, hair conditioners, adhesives, perfumes, caulks, masonry wall repair kits, catalyst blends, pharmaceutical drugs, food additives, polymer blends, blends of reactants; blends of food products, such as ready-to-use soups, cake mixes, spice mixtures, coffee blends, ice cream blends; or a point-of-purchase consumer products. The present invention provides for a device and a process used therein to monitor production of such compositions and more particularly directed to monitoring paint cans and paints contained therein during their life cycle.

Figure 1:
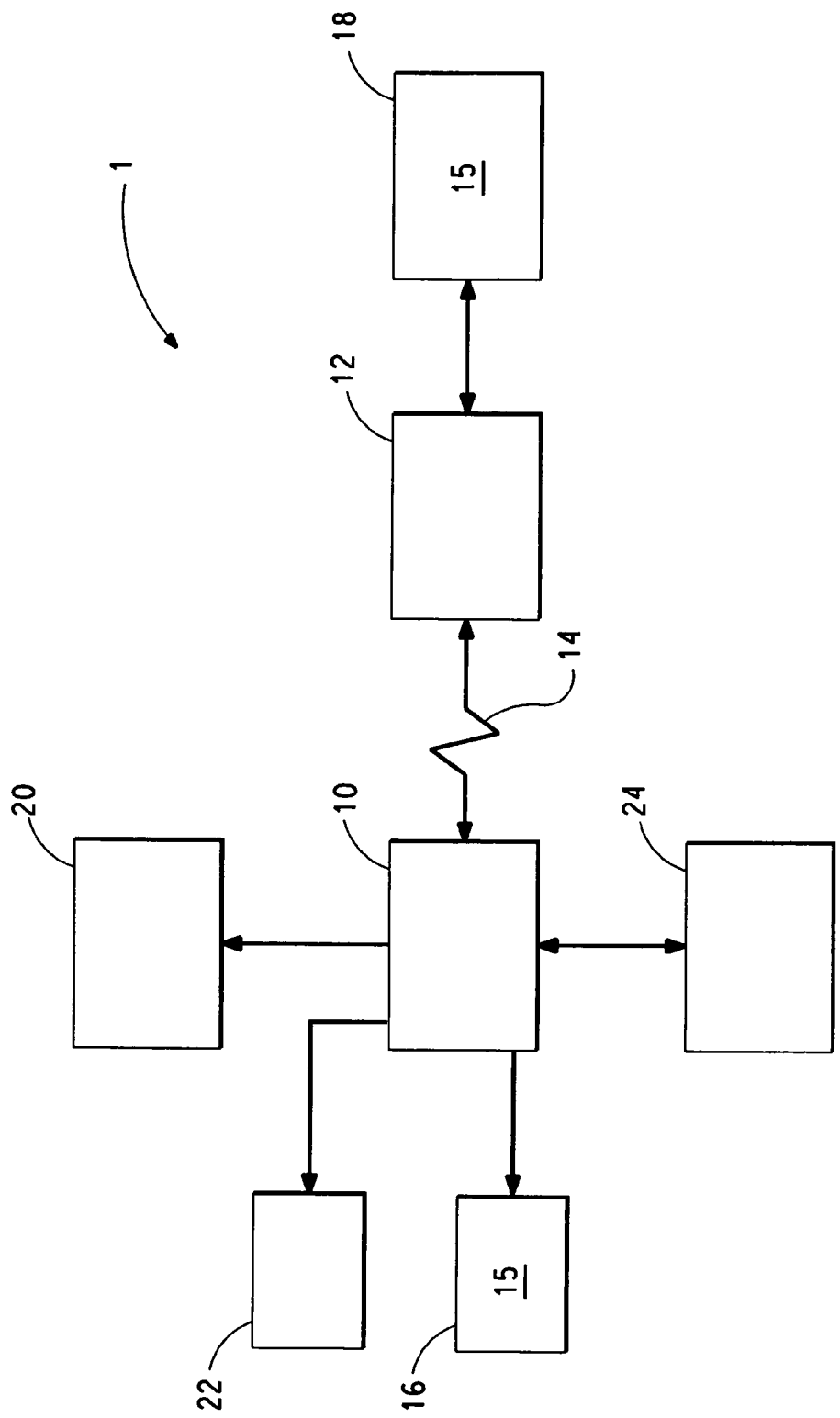
FIG. 1 broadly illustrates one of the embodiments of the device of the present invention.

FIG. 1 illustrates the broadest aspects of the preferred embodiment of a-monitoring device 1 of the present invention. Device 1 includes a client computer 10 and a host computer 12 in communication with client computer 10 via a conventional communication link 14, such as modem, internet, local area network, or a wireless communication system. A conventional client computer usable storage medium 16 is located in client computer 10 and a conventional host computer usable storage medium 18 is located in host computer 12. Client computer 10 is preferably provided with a conventional monitor/key board 20 and a conventional printer 22. Client computer 10 and host computer 12 can be any known computer/processor such as those supplied by Dell Computer Corporation, Round Rock, Texas or IBM Corporation, Armonk, N.Y that can be configured to execute conventional computer program codes.

It should be understood that client computer 10 and host computer 12 can be located anywhere, such as for example computer 10 can be located in one country, such as the United States, or another state and host computer 12 can be located in another country, such as Canada, or another state. Alternatively, host computer 12 can be located in one country, such as United States, or another state and client computer 10 can be located in another country, such as Canada, or another state. It should be further understood that host computer 12 could be in communication with plurality of client computers 10.

Figure 2:
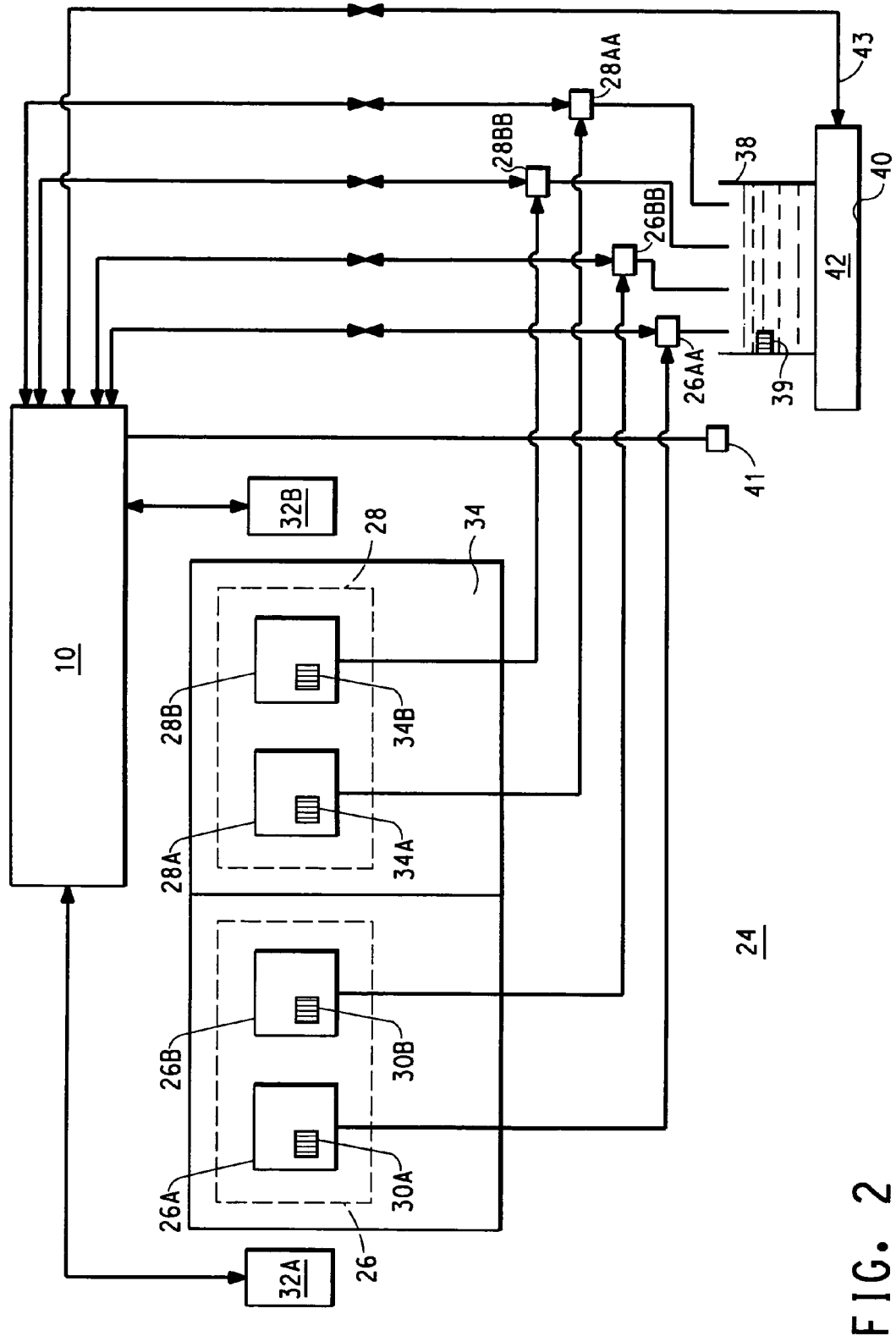
FIG. 2 broadly illustrates the dispensing means used in the device of FIG. 1.

Device 1 further includes means for dispensing 24, the details of which are provided in FIG. 2. Storing means 34, such as racks, can be employed to store current stock 26, indicated by a dotted line box, which typically contains one or more stock composition containers 26A and one or more stock component containers 26B. Current stock 26 can be augmented with a supplementary stock 28, indicated by dotted line, which typically contains additional quantities of stock compositions stored in additional stock composition containers 28A and any missing stock components contained in missing stock component containers 28B. It is contemplated that stock compositions, additional quantities of the stock compositions, stock components or any missing stock components could also be brought to device 1, as required, from a storage area. It should be understood that the various aforedescribed containers could be arranged in any other manner, if so desired, as the physical positioning of such containers is not critical.

Stock information on containers can be provided through identification tags such as, stock composition information on stock composition identification tags 30A affixed to stock composition containers 26A, stock component information on stock components identification tags 30B affixed to stock component containers 30B, additional stock composition information on additional stock composition identification tags 34A affixed to additional stock composition containers 28A and missing stock component information on missing stock components identification tags 34B affixed to missing stock component containers 28B.

The aforedescribed tags can be bar code tags, conventional RFID tags, or a combination thereof where the bar code can be printed on top of the RFID tags such that the information contained in the tag can be read with either bar code reader or conventional RFID interrogator. RFID tag system is preferred. A basic RFID system typically includes an interrogator that includes an interrogator antenna or coil, and a transceiver (with decoder); and a transponder provided with a transponder antenna or coil (RFID tag), wherein the transponder is electronically programmed with unique information. The interrogator antenna emits radio signals to activate the tag and read and write data to it. Antennas are the conduits between the tag and the transceiver, which controls the system's data acquisition and communication. Antennas, which are available in a variety of shapes and sizes can be built into a frame to receive tag data from articles passing or positioned near the frame. Frequently, the interrogator (a.k.a. reader), which is packaged with the interrogator antenna and the transceiver/decoder to can be configured either as a handheld or a fixed-mount device. The interrogator emits radio waves in ranges of anywhere from few millimeters to 30 meters or more, depending upon its power output and the radio frequency used. When an RFID tag passes through or near the electromagnetic zone, it detects the interrogator's activation signal. The interrogator decodes the data encoded in the tag's integrated circuit (silicon chip) and the data is passed to the host computer for processing.

RFID tags come in a wide variety of shapes and sizes and are categorized as either active or passive. Active RFID tags are powered by an internal battery and are typically read/write, i.e., tag data can be rewritten and/or modified. An active tag's memory size varies according to application requirements; some systems operate with up to 1MB of memory. In a typical read/write RFID work-in-process system, a tag might transmit to a machine a set of instructions, and the machine would then report its performance to the tag. This encoded data would then become part of the tagged part's history. The battery-supplied power of an active tag generally gives it a longer read range. The trade off is greater size, greater cost, and a limited operational life (which may yield a maximum of 10 years, depending upon operating temperatures and battery type). Typical RFID tags and method of producing them is disclosed in the U.S. Pat. No. RE37,956E, which is incorporated herein by reference.

By contrast, passive RFID tags operate without a separate external power source and obtain operating power generated from the interrogator. Passive tags are consequently much lighter than active tags, less expensive, and offer a virtually unlimited operational lifetime. The trade off is that they have shorter read ranges than active tags and require a higher-powered interrogator.

RFID systems suitable for use in the present intention preferably operate at frequencies ranging from 125 KHz to 2.45 GHz. The significant advantage of all types of RFID systems is the non-contact, non-line-of-sight nature of the technology. Tags can be read through a variety of substances such as dirt, crusted grime, and other visually and environmentally challenging conditions, where barcodes or other optically read technologies would be useless. RFID tags can also be read in challenging circumstances at remarkable speeds, in most cases responding in less than 100 milliseconds. The read/write capability of an active RFID system is also a significant advantage in interactive applications of the process of the present invention.

One or more conventional interrogators 32A and 32B can be used to read the stock composition information, stock component information, additional stock composition information and missing stock component information. Some of the typical bar code readers include Maxiscan 2210 supplied by Intermec Technologies Corporation of Everett, Wash. or MC9000-G supplied by Symbol Technologies of Holtsville, N.Y. and some of the typical RFID interrogators include Model 915 or 2450 supplied by Alien Technology Corporation of Morgan Hill, Calif.; Fasttrack LRP or HMS models supplied by Escort Memory Systems of Scotts Valley, Calif.; and Models MP9111, MP9112, MP9210, MP9320, and 13.56 all supplied by Samsys Technologies, Inc. of Richmond Hill, Ontario, Canada. Some of the typical combination bar code reader/RFID interrogators include Model 1555 supplied by Intermec Technologies Corporation of Everett, Wash.; or Model HHR supplied by Matrics, Inc. of Columbia, Md. When the aforedescribed containers are made of metal or metal alloy, such as steel, RFID tags are preferably disposed on an insulated substrate, such as paper, plastic film, or a resinous coating, such as a painted surface, to insulate RFID tags from the metal containers. It is contemplated that RFID tags, including tag antennas could be directly printed on the aforedescribed containers by using conductive ink or conductive ink jet ink printing process developed, for example, by Carclo PLC of Wakefield, United Kingdom.

The stock composition information on stock composition identification tags 30A affixed to stock composition containers 26A, stock component information on stock components identification tags 30B affixed to stock component containers 26B, additional stock composition information on additional stock composition identification tags 34A affixed to additional stock composition containers 28A and missing stock component information on missing stock components identification tags 34B affixed to missing stock component containers 28B. One or more conventional interrogators 32A and 32B can be used to read the stock composition information, stock component information, additional stock composition information and missing stock component information.

The stock composition information on stock composition identification tags 30A can include identity of the stock composition, compositional structure of the stock composition, quantity of the stock composition contained in the stock composition container, price of the stock composition contained in the stock composition container, serial number of the stock composition container, place of manufacture of the stock composition, location of the stock composition container, date of manufacture of the stock composition, date of expiration of the stock composition, toxicity information of the stock composition, MSDS of the stock composition, manufacturer of the stock composition and contact information thereof; or a combination thereof.

The stock component information on stock component identification tags 30B can include identity of the stock component, compositional structure of the stock component, quantity of the stock component contained in the stock component container, price of the stock component contained in the stock component container, place of manufacture of the stock component, location of the stock component container, date of manufacture of the stock component, serial number of the stock component container, date of expiration of the stock component, toxicity information of the stock component, MSDS of the stock component, manufacturer of the stock component and contact information thereof; or a combination thereof.

The additional stock composition information on additional stock composition identification tags 34A can include identity of the additional stock composition, compositional structure of the additional stock composition, quantity of the additional stock composition contained in the additional stock composition container, price of the additional stock composition contained in the additional stock composition container, place of manufacture of the additional stock composition, location of the additional stock composition container, date of manufacture of the additional stock composition, serial number of the additional stock composition container, date of expiration of the additional stock composition, toxicity information of the additional stock composition, MSDS of the additional stock composition, manufacturer of the additional stock composition and contact information thereof; or a combination thereof. It is contemplated that the additional stock compositions can be the same as the stock compositions or they can be one or more additional stock compositions that match on the basis of preset criteria.

The missing stock component information on missing stock component identification tags 34B can include identity of the missing stock component, compositional structure of the missing stock component, quantity of the missing stock component contained in the missing stock component container, price of the missing stock component contained in the missing stock component container, place of manufacture of the missing stock component, location of the missing stock component container, serial number of the missing stock component container, date of manufacture of the missing stock component, date of expiration of the missing stock component, toxicity information of the missing stock component, MSDS of the missing stock component, manufacturer of the missing stock component and contact information thereof; or a combination thereof. The present invention contemplates adding one or more missing stock components to any stock compositions that do not match the formulas associated with the identified characteristics so that such modified stock compositions could then be utilized as target compositions.

In one of the embodiments, means for dispensing 24 further include conventional means for conveying, such as tubes or pipes, to convey the contents from containers 26A, 26B, 28A and 28B via respective conventional dispenser nozzles 26AA, 26BB, 28AA and 28BB to an identified target composition receiver 38, which is provided with a target composition identification tag 39, which can be read by or written to by an identification interrogator 41, which is similar to the ones described earlier. Alternatively, it is contemplated that a single dispensing nozzle, instead of the aforementioned plurality of nozzles, could be employed to convey the contents from the various aforedescribed containers to receiver 38. One type of dispenser apparatus suitable for use in the present invention is described in PCT application having International Publication Number WO 03/084653A1.

Dispenser nozzles 26AA, 26BB, 28AA and 28BB are in communication with client computer 10', such that the opening and closing of dispenser nozzles 26M, 26BB, 28M and 28BB can be controlled by client computer 10', in accordance with the formula. It should be noted that quantity of contents dispensed from current stock 26 and/or supplementary stock 28 can be controlled on a volumetric or preferably on a gravimetric basis. To control the dispensed content on the volumetric basis, dispenser nozzles 26AA, 26BB, 28M and 28BB could be provided with conventional means to determine the volume of dispensed items. Alternatively, or in conjunction therewith, dispensing means 24 can be provided with means 40 for weighing the required items dispensed into identified target composition receiver 38. Means 40 typically include a conventional weighing scale 40, such as Model KB60sx supplied by Mettler-Toledo Incorporated of Columbus, Ohio or Model SC2CCE-SX supplied by Sartorius AG of Göettingen, Germany, on which receiver 38 can be positioned. Typically, means 40 include means 42 for generating a signal upon completion of dispensing of the required items in accordance with the required inventory and then transmitting the signal to client computer 10' via means 43 for transmitting the signal to client. Means 43 can be configured to transmit the signal to host computer 12 (shown in FIG. 1), or to client computer 10' and host computer 12. Alternatively or in combination thereof, it is contemplated that one could manually read off the amounts of dispensed items displayed on a weighing scale and then manually enter the data into client computer 10'.

It is further contemplated that once the dispensing process is completed, one can, using identification interrogator 41, write and/or print to target composition identification tag 39 a target composition information that includes the identity of the target composition, compositional structure of the target composition, quantity of the target composition contained in target composition content receiver 38, price of the target composition contained in the target composition content receiver 38, place of manufacture of the target composition, location of target composition content receiver 38, date of manufacture of the target composition, serial number of target composition content receiver 38, date of expiration of the target composition, toxicity information of the target composition, MSDS of the target composition, manufacturer of the target composition and contact information thereof; or a combination thereof. Interrogator 41 can be a barcode label printer/RFID writer, such as Easycoder F2 or F4 supplied by Intermec Technologies Corporation if Everett, Wash. or Model R-140 or R-402 supplied by Zebra Technologies International of Vernon Hills, Ill.

In order to allow the user to make the target composition closer to the place of customer's business, it is contemplated that device 1 could be built as a transportable device in which the relevant portions of device 1 are installed in a van or a trailer that could be driven to the customer's place of business where the target composition can then be made.

Figure 3A:
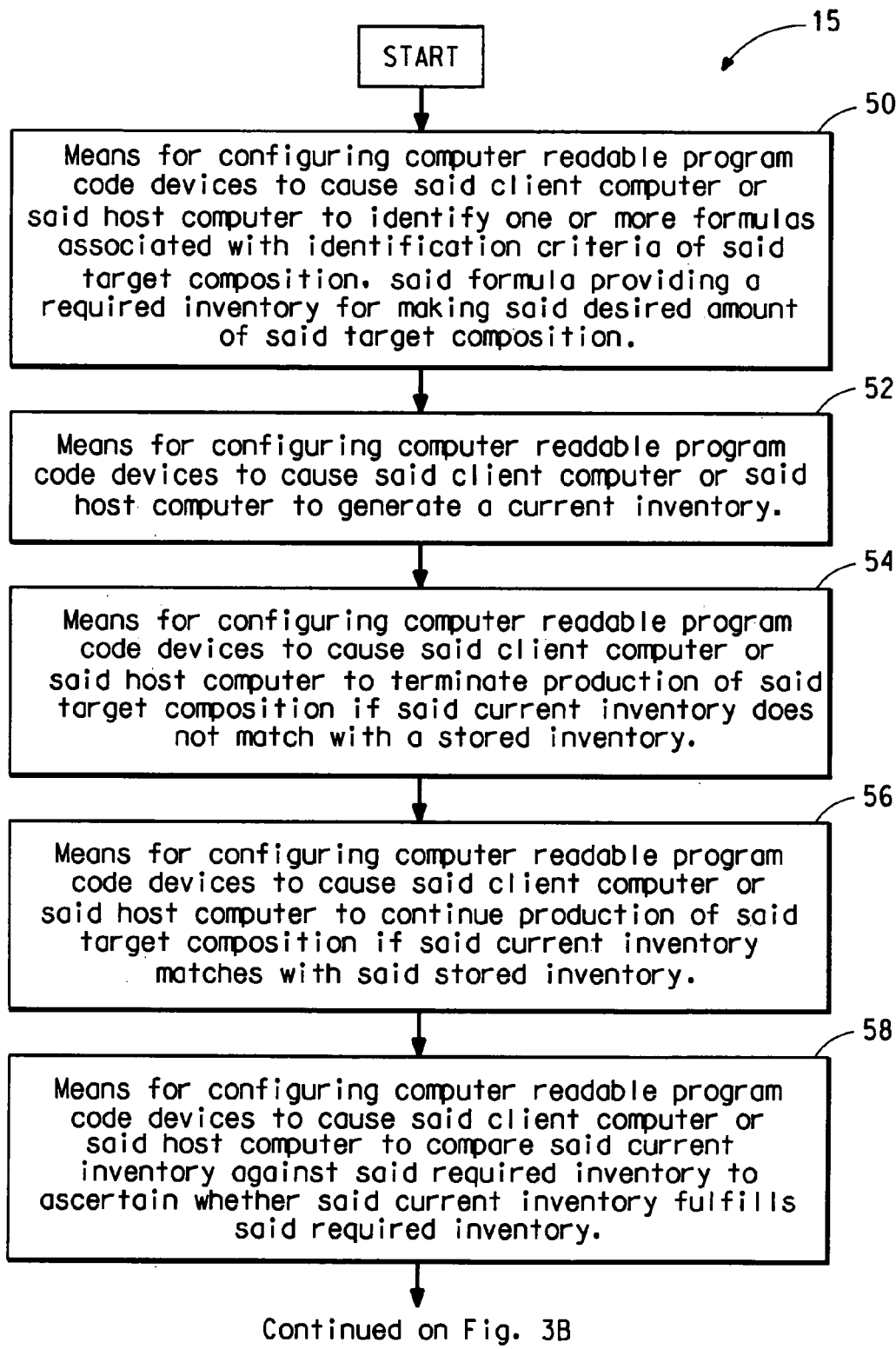
FIGS. 3A and 3B represent a flowchart that broadly illustrates computer readable program code means used in the device of the present invention illustrated in FIG. 1.
Figure 3B:
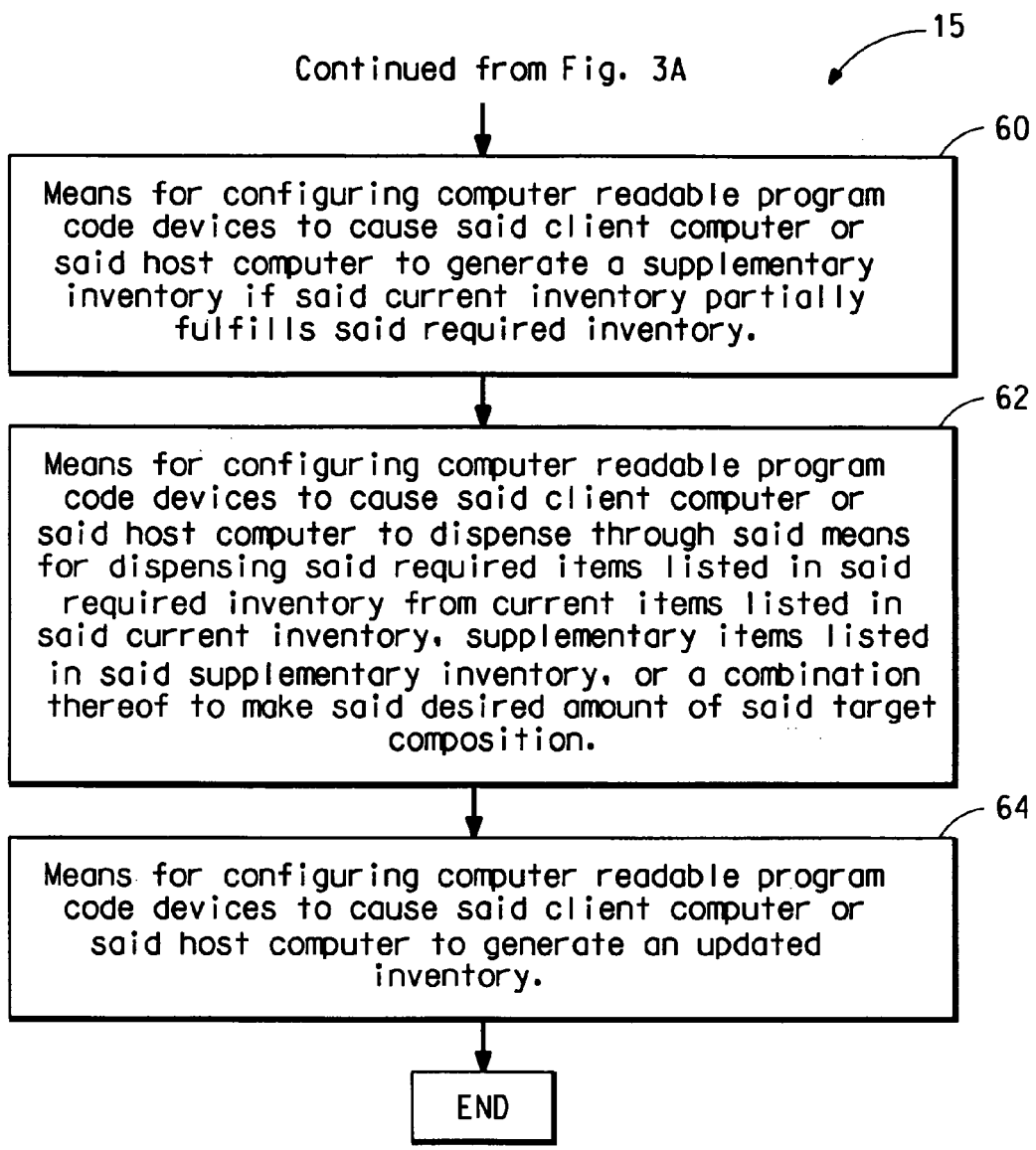

In device 1 client computer usable storage medium 16, host computer usable storage medium 18, or both have computer readable program code means 15 loaded therein for monitoring production of a target composition, which can be written by using conventional programming software, such as C++ Builder, Version 5 or Delphi, Version 6, both supplied by Borland Corporation located in Scotts Valley, Calif. Details of computer readable program code 15, shown in FIGS. 3A and 3B, include:

Means 50 for configuring computer readable program code devices to cause client computer 10 or host computer 12 to identify one or more formulas associated with the identification criteria of the target composition, the formula providing a required inventory for making the desired amount of the target composition. For example, the identification criteria of the target composition in the form of an automotive paint can include, one or more of a manufacturer name, make, model, year of production, color name, paint code, cross reference information, intended use, VIN number, or spectrophotometric data of a vehicle or its color. The identification criteria can be entered manually by the user in client computer 10 or it can reside on an identification criteria identification tag, such as RFID tag or bar code tag positioned on a vehicle or on a color reference chip supplied by a manufacturer, in which case the user can then use a conventional identification interrogator to read off and enter the identification criteria directly from the tag into client computer 10. It is understood that for some other uses, such as architectural coating compositions, other types of identification criteria, such as a manufacturer name, year of production, color name, paint code, cross reference information, intended use, or spectrophotometric data of a wall or its color, could be employed. The characteristics associated with the identification criteria typically include, for example, color characteristics, such as conventional L,a,b color data or spectral data; the volatile organic content (VOC); pH of aqueous compositions; appearance characteristics, such as flop of metallic paint compositions; coefficient of friction; and viscosity. The required inventory, which is based on the formula includes information on required items such as (a) one or more compositions matching the characteristics and quantities thereof required to make the desired amount of the target composition; (b) target components and quantities thereof listed in the formula that are required to make the desired amount of the target composition; or a (c) combination of (a) and (b).

Figure 4:
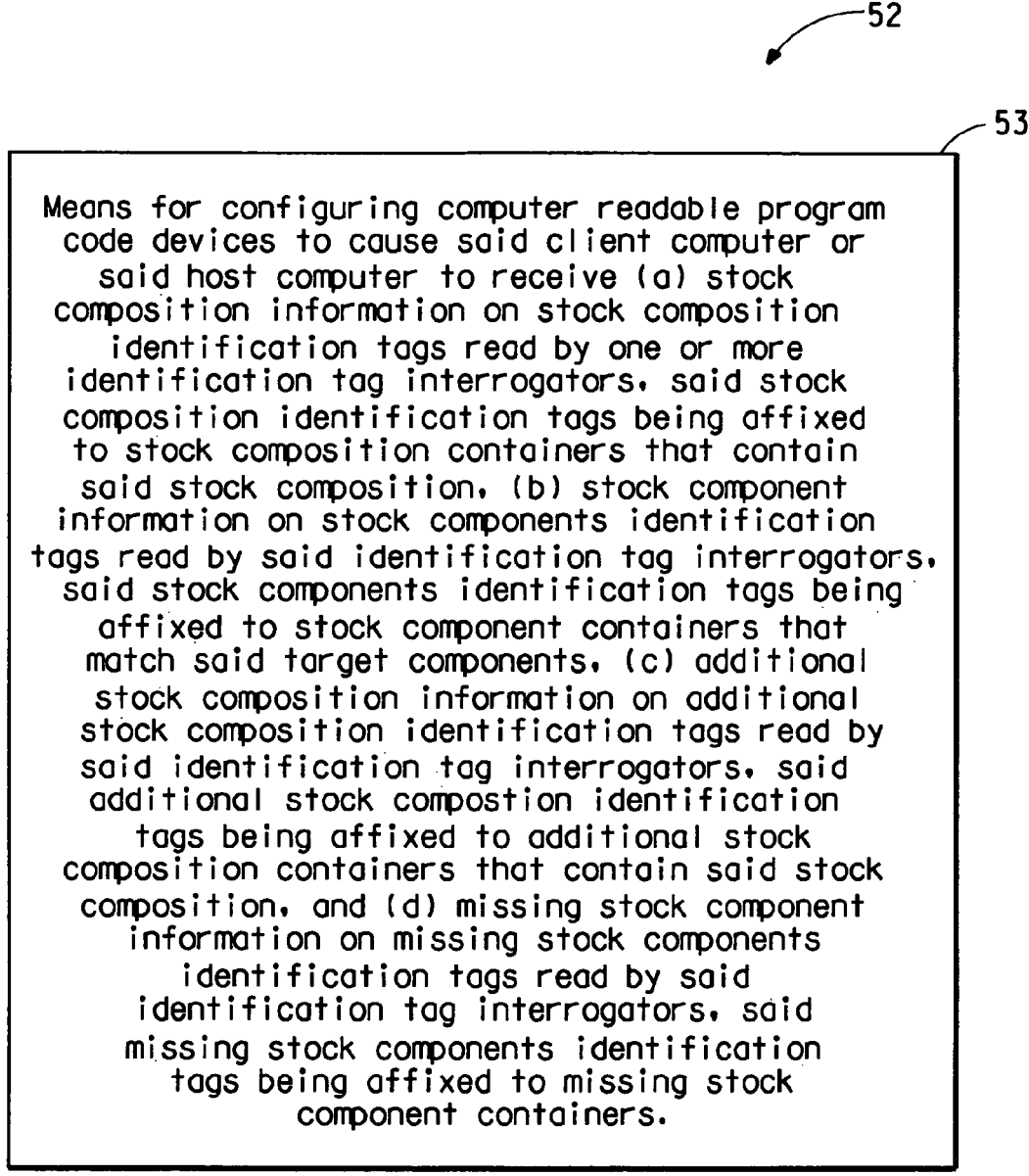
FIG. 4 provides further details of means for configuring computer readable program code devices to cause a client computer or a host computer to generate a current inventory shown in FIG. 3A.

Means 52 for configuring computer readable program code devices to cause client computer 10 or host computer 12 to generate a current inventory, which includes information on the current items, such as (a) one or more stock compositions matching the characteristics and quantities thereof required to make the desired amount of said target composition; (b) stock target components and quantities thereof listed in said formula that are required to make the desired amount of said target composition; or (c) a combination of (a) and (b). The current inventory typically refers to the items that can be readily dispensed by device 1 before the dispensing of the required items listed in the required inventory, and would include current stock 26 and supplementary stock 28. The current inventory is then entered into client computer 10 before the required items are dispensed by means 24 for dispensing. If there were no changes, such as replenishing of any depleted stock compositions or stock components or removal of such items from storing means 34, it may not be necessary to renter the current inventory since it was not changed during the previous dispensing cycle. As shown in FIG. 4, means 52 also include means 53 configured to cause client computer 10 or host computer 12 to receive (a) the stock composition information on stock composition identification tags 30A read by one or more identification tag interrogators 32A, (b) the stock component information on stock components identification tags 30B read by identification tag interrogators 32A, (c) the additional stock composition information on additional stock composition identification tags 34A read by identification tag interrogators 32B, and (d) the missing stock component information on missing stock components identification tags 34B read by said identification tag interrogators 32B.

Means 54 for configuring computer readable program code devices to cause client computer 10 or host computer 12 to terminate production of the target composition if the current inventory does not match with a stored inventory, such as, for example, if the amounts of various items in the current inventory exceed those amounts stored in the stored inventory. The stored inventory typically results from updating of the current inventory during the previous dispensing cycle. The stored inventory can be stored in storage medium 16 on client computer 10, or preferably on storage medium 18 on host computer 12. If desired, the stored inventory can be simultaneously stored in storage media 16 and 18. Means 54 allow the user to employ stock compositions, or stock components or missing stock components that meet the quality requirement of these items listed in the formula, i.e., only the genuine pre-approved items can be used. Means 54 also prevent the user from refilling or reusing the previously used up containers (dead containers), such as a stock composition container or stock component container whose contents had been used up earlier. As a result, the manufacturer or the supplier of the stock composition, or stock components has up-to-date real time inventory of these items and can then readily re-supply these items based on the up-to-date real time information available from the stored inventory, which the manufacturer or the supplier can obtain by accessing the stored inventory residing on client computer 10 or host computer 12.

Means 56 for configuring computer readable program code devices to cause client computer 10 or host computer 12 to continue production of the target composition if the current inventory matches with the stored inventory.

Means 58 for configuring computer readable program code devices to cause client computer 10 or host computer 12 to compare the current inventory against the required inventory to ascertain whether the current inventory fulfills said required inventory. Thus, if one or more component listed in the formula is missing or if less than the desired amount of the stock compositions is available in the current inventory it would be clear that the current inventory fails to fulfill the required inventory.

Means 60 for configuring computer readable program code devices to cause client computer 10 or host computer 12 to generate a supplementary inventory if the current inventory partially fulfills the required inventory. It would be clear to one of ordinary skill in the art that means 60 would not be utilized if in means 58 it was determined that the current inventory does fulfill the required inventory. The supplementary inventory includes information on (a) additional quantities of the stock compositions required to produce the desired amount of the target composition, (b) any missing stock components that match the target components listed in said formula in sufficient quantities required to produce the desired amount of the target composition, or (c) a combination of (a) and (b).

Means 62 for configuring computer readable program code devices to cause client computer 10 or host computer 12 to dispense through means 24 for dispensing the required items listed in the required inventory from current items listed in the current inventory, supplementary items listed in the supplementary inventory, or a combination thereof to make the desired amount of the target composition.

Figure 5:
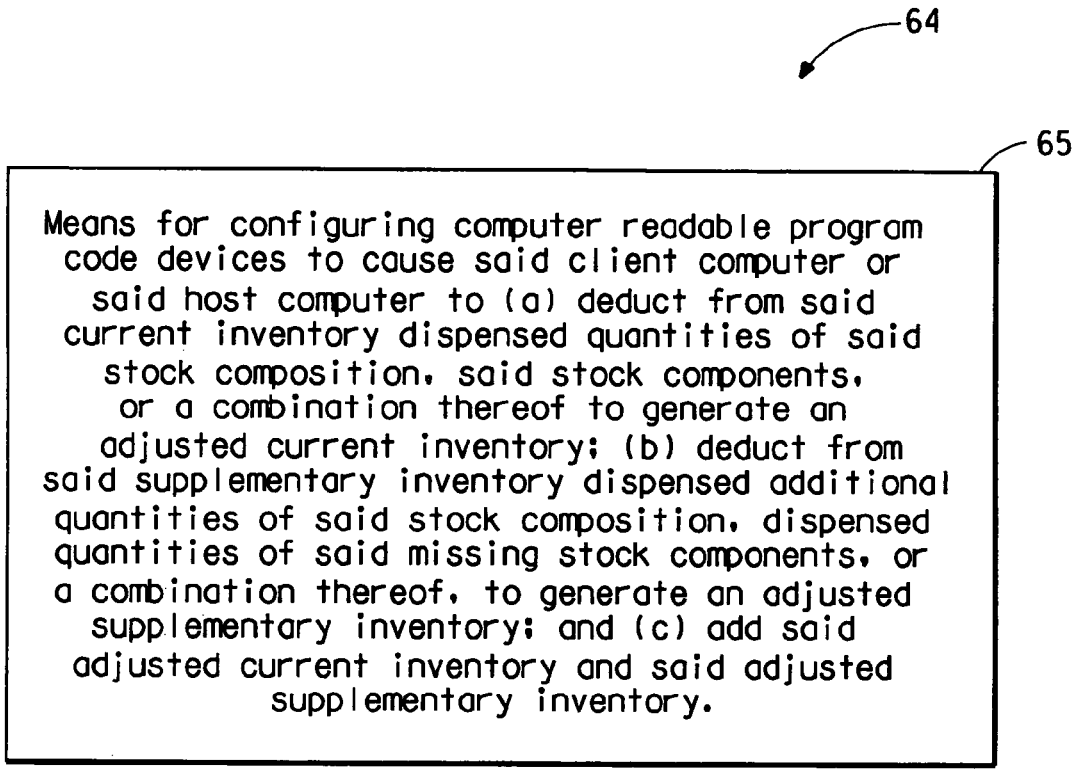
FIG. 5 provides further details of means for configuring computer readable program code devices to cause the client computer or the host computer to generate an updated inventory shown in FIG. 3B.

Means 64 for configuring computer readable program code devices to cause client computer 10 or host computer 12 to generate an updated inventory. As shown in FIG. 5, means 64 comprise means 65 for configuring computer readable program code devices to cause client computer 10 or host computer 12 to (a) deduct from the current inventory dispensed quantities of the stock composition, the stock components, or a combination thereof to generate an adjusted current inventory; (b) deduct from the supplementary inventory dispensed additional quantities of the stock composition, dispensed quantities of the missing stock components, or a combination thereof, to generate an adjusted supplementary inventory; and (c) add the adjusted current inventory and the adjusted supplementary inventory. The aforementioned sum then becomes the updated inventory. It should be noted the updated inventory would then become the stored inventory in the subsequent dispensing cycle.

Figure 6:
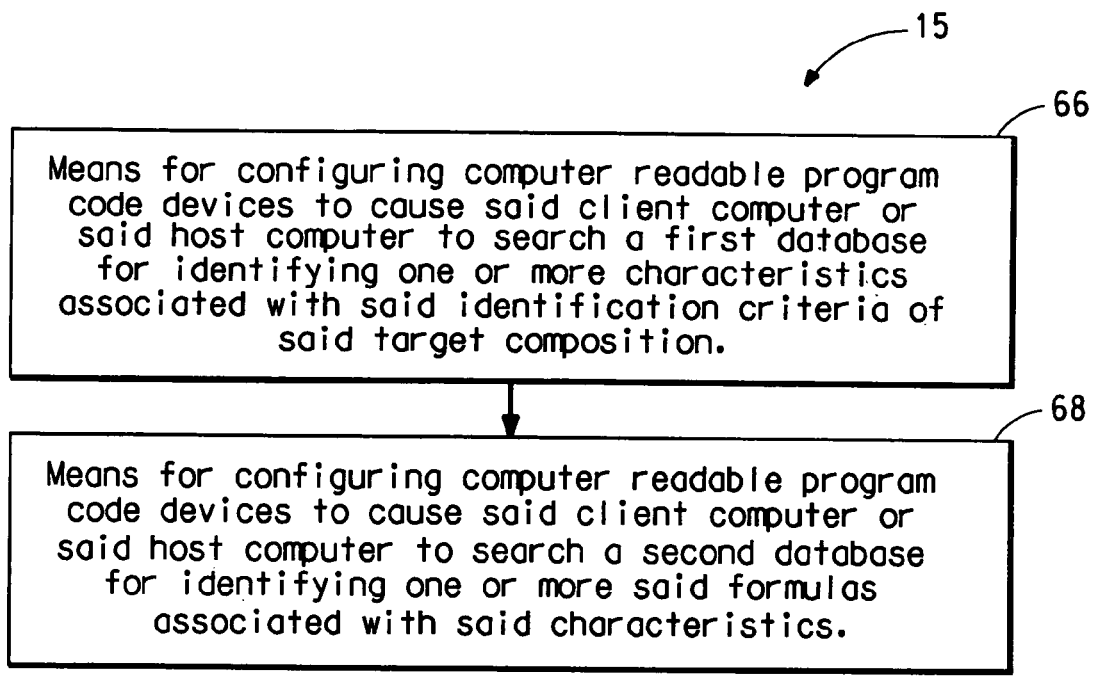
FIG. 6 represents a flowchart that further illustrates computer readable program code means used in the device of the present invention illustrated in FIG. 1.

Computer readable program code 15, shown in FIG. 6, further includes:

means 66 for configuring computer readable program code devices to cause client computer 10 or host computer 12 to search a first database for identifying one or more characteristics associated with the identification criteria of the target composition; and means 68 for configuring computer readable program code devices to cause client computer 10 or host computer 12 to search a second database for identifying one or more said formulas associated with the characteristics.

The first database can be stored on client computer 10 and the second database can be stored on host computer 12. Alternatively, the first and the second database can both be stored on host computer 12 in communication with client computer 10, or the first and the second database both can be stored on the client computer 10.

The present invention is also directed to a process for monitoring production of the target composition. All the terms described in the following process are the same as those described earlier. In its broadest aspect the process includes:

(A) identifying one or more formulas associated with identification criteria of the target composition, the formula providing a required inventory for making a desired amount of the target composition.

(B) generating a current inventory.

(C) terminating the process if the current inventory does not match with a stored inventory; or (D) continuing the process if the current inventory matches with the stored inventory, the process further comprising:

(D1) comparing the current inventory against the required inventory to match the current inventory with the required inventory;

(D2) generating a supplementary inventory if the current inventory partially matches with the required inventory;

(D3) dispensing required items listed in the required inventory from current items listed in the current inventory, supplementary items listed in the supplementary inventory, or a combination thereof to make the desired amount of the target composition; and (D4) generating an updated inventory. The foregoing step (D3) is accomplished by dispensing means 24 of device 1.

In the foregoing process also includes (a) searching a first database for identifying one or more characteristics associated with the identification criteria of the target composition; and (b) searching a second database for identifying one or more the formulas associated with the characteristics. The formula is preferably a color formula.

The step (D2) in the foregoing process includes:

(a) reading with one or more identification tag interrogators 32B;

(i) additional stock composition information on additional stock composition identification tags 34A affixed to additional stock composition containers 28A that contain the stock composition, (ii) missing stock component information on missing stock components identification tags 34B affixed to missing stock component containers 28B, or (iii) a combination of (i) and (ii); and (b) storing the supplementary inventory.

The step (D4) in the foregoing process includes:

(a) deducting from the current inventory dispensed quantities of the stock composition, the stock components, or a combination thereof to generate an adjusted current inventory;

(b) deducting from the supplementary inventory dispensed additional quantities of the stock composition, dispensed quantities of the missing stock components, or a combination thereof, to generate an adjusted supplementary inventory; and (c) adding the adjusted current inventory and the adjusted supplementary inventory.

In the foregoing process, the updated inventory can be stored on the client computer, on the host computer, or on the client computer and the host computer and the required items in the required inventory are dispensed in identified target composition receiver 38.

The foregoing process can further include supplying some or all of the required items required to augment the updated inventory. As a result, most or all of all of the items could be made available during the subsequent use.

It is further contemplated that the updated inventory could be stored on a storage identification tag 34A affixed to storing means 34, which could be updated every time device 1 dispenses the required items required to make the target composition. It is understood storage identification tag 34A could be the aforedescribed conventional RFID tag, bar code tag or a combination thereof.

Another embodiment of the process of the present invention includes:

(A) entering identification criteria of the target composition on client computer 10 or on host computer 12 in communication with client computer 10;

(B) searching a first database residing on client computer 10 or on host computer 12 for identifying one or more characteristics associated with the identification criteria;

(C) searching a second database residing on client computer 10 or on host computer 12 for one or more formulas associated with the characteristics, the formula providing a required inventory for making a desired amount of the target composition;

(D) generating a current inventory;

(E) storing the current inventory on client computer 10 or on host computer 12;

(F) terminating the process if the current inventory does not match with a stored inventory stored on client computer 10 or on host computer 12; or;

(G) continuing the process if the current inventory matches with the stored inventory, the process further comprising:

(G1) comparing the current inventory against the required inventory to ascertain whether said current inventory fulfills said required inventory;

(G2) generating a supplementary inventory if the current inventory partially fulfills the required inventory wherein the supplementary inventory stored on the client computer or on the host computer;

(G3) dispensing required items listed in the required inventory from current items listed in the current inventory, supplementary items listed in the supplementary inventory, or a combination thereof to make the desired amount of the target composition;

(G4) generating an updated inventory; and (G5) storing the updated inventory on the client computer or on the host computer. In the foregoing process the second database, the stored inventory and the updated inventory can be stored on the host computer 12. The foregoing step (G3) is accomplished by dispensing means 24 of device 1.

Another embodiment of the process of the present invention includes:

(A) receiving identification criteria of the target composition from client computer 10 in communication with host computer 12;

(B) searching a first database for identifying one or more characteristics associated with the identification criteria, the first database residing on host computer 12;

(C) searching a second database residing on host computer 12 for one or more the formulas associated with the characteristics, the formula providing a required inventory for making a desired amount of the target composition;

(D) receiving a current inventory from client computer 10;

(E) terminating the process if the current inventory does not match with a stored inventory residing on host computer 12; or (F) continuing the process if the current inventory matches with the stored inventory, the process further comprising:

(F1) comparing the current inventory against the required inventory to ascertain whether said current inventory fulfills said required inventory;

(F2) generating a supplementary inventory if the current inventory partially fulfills the required inventory wherein the supplementary inventory stored on client computer 10 or on host computer 12;

(F3) dispensing required items listed in the required inventory from current items listed in the current inventory, supplementary items listed in the supplementary inventory, or a combination thereof to make the desired amount of the target composition;

(F4) generating an updated inventory; and (F5) storing the updated inventory on client computer 10 or on host computer 12. The foregoing step (F3) is accomplished by dispensing means 24 of device 1.

Still another embodiment of the process of the present invention includes:

(A) receiving identification criteria of the target composition from client computer 10 in communication with host computer 12;

(B) searching a first database for identifying one or more characteristics associated with the identification criteria, the first database residing on host computer 12;

(C) searching a second database residing on host computer 12 for one or more the formulas associated with the characteristics, the formula providing a required inventory for making a desired amount of the target composition;

(D) receiving a current inventory from client computer 10;

(E) terminating the process if the current inventory does not match with a stored inventory residing on host computer 12; or (F) continuing the process if the current inventory matches with the stored inventory, the process further comprising:

(F1) sending to client computer 10 the formulas;

(F2) receiving from client computer 10 an updated inventory; and (F3) storing the updated inventory on host computer 12.

The foregoing embodiments of the process can also include supplying some or all of the required items required to augment the updated inventory. As a result, most or all of all of the items could be made available during the subsequent use.

The present invention is also directed to a portable computer usable storage medium, such as a CD-Rom having the aforedescribed computer readable program code means 15 stored therein.

Figure 7:
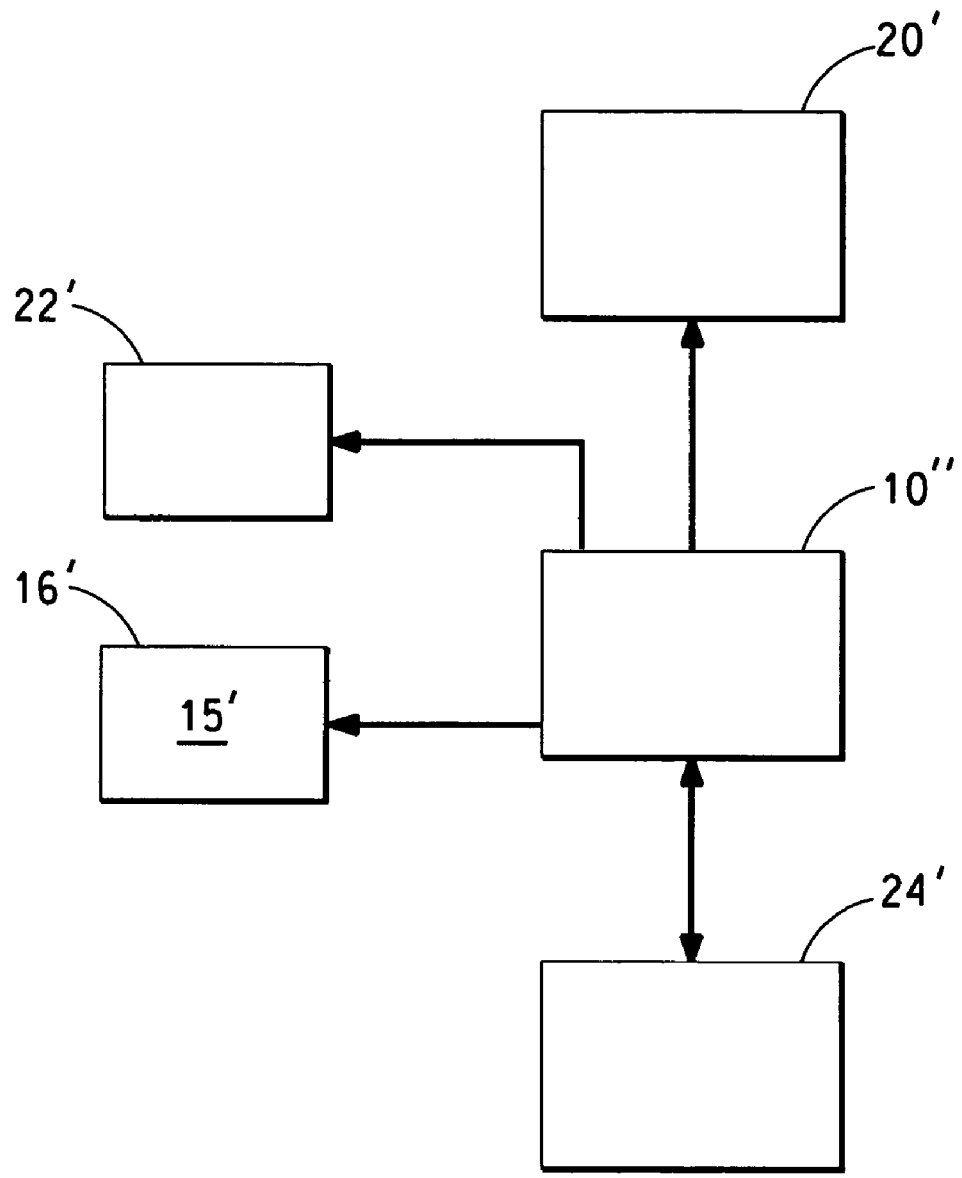
FIG. 7 broadly illustrates another embodiments of the device of the present invention.

The applicants also contemplate another embodiment of the present invention shown in FIG. 7 illustrating the broadest aspects of a monitoring device 2 of the present invention, which includes a stand-alone computer 10" having usable storage medium 16' is located therein. Computer 10" can be provided with a conventional monitor/key board 20' and a conventional printer 22'. Client computer 10" can be any conventional computer/processor such as those supplied by Dell Computer Corporation, Round Rock, Texas or IBM Corporation, Armonk, N.Y. that can be configured to read conventional computer program codes. Device 2 include means 24' for dispensing, which are the same as means 24 described earlier in FIG. 2. Computer programmable code 15' would be similar to computer programmable code 15 described earlier, except all the information generated during the process is stored on stand-alone computer 10".

Figure 8A:
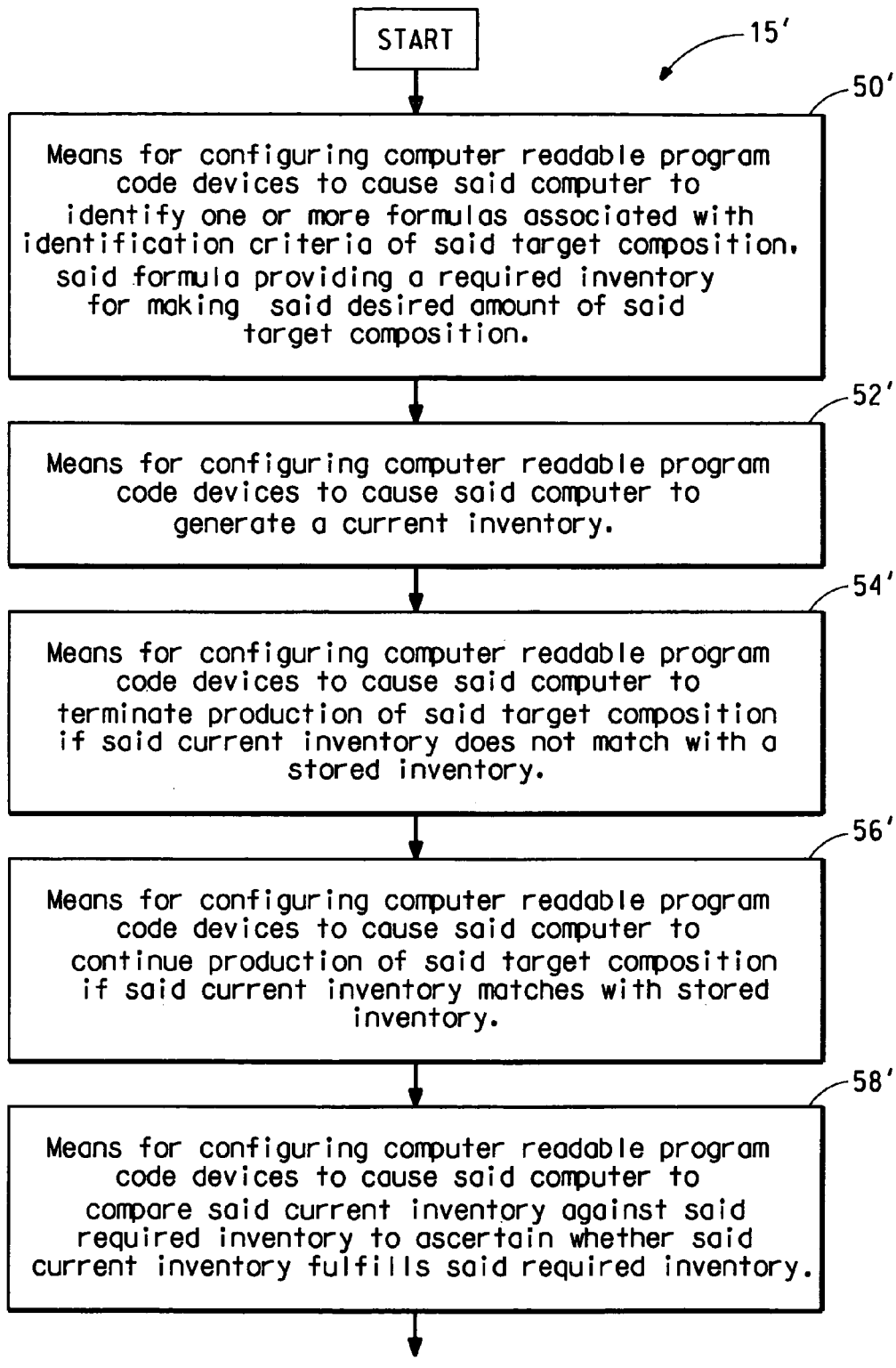
FIGS. 8A and 8B represent a flowchart that broadly illustrates computer readable program code means used in the device of the present invention illustrated in FIG. 7.
Figure 8B:
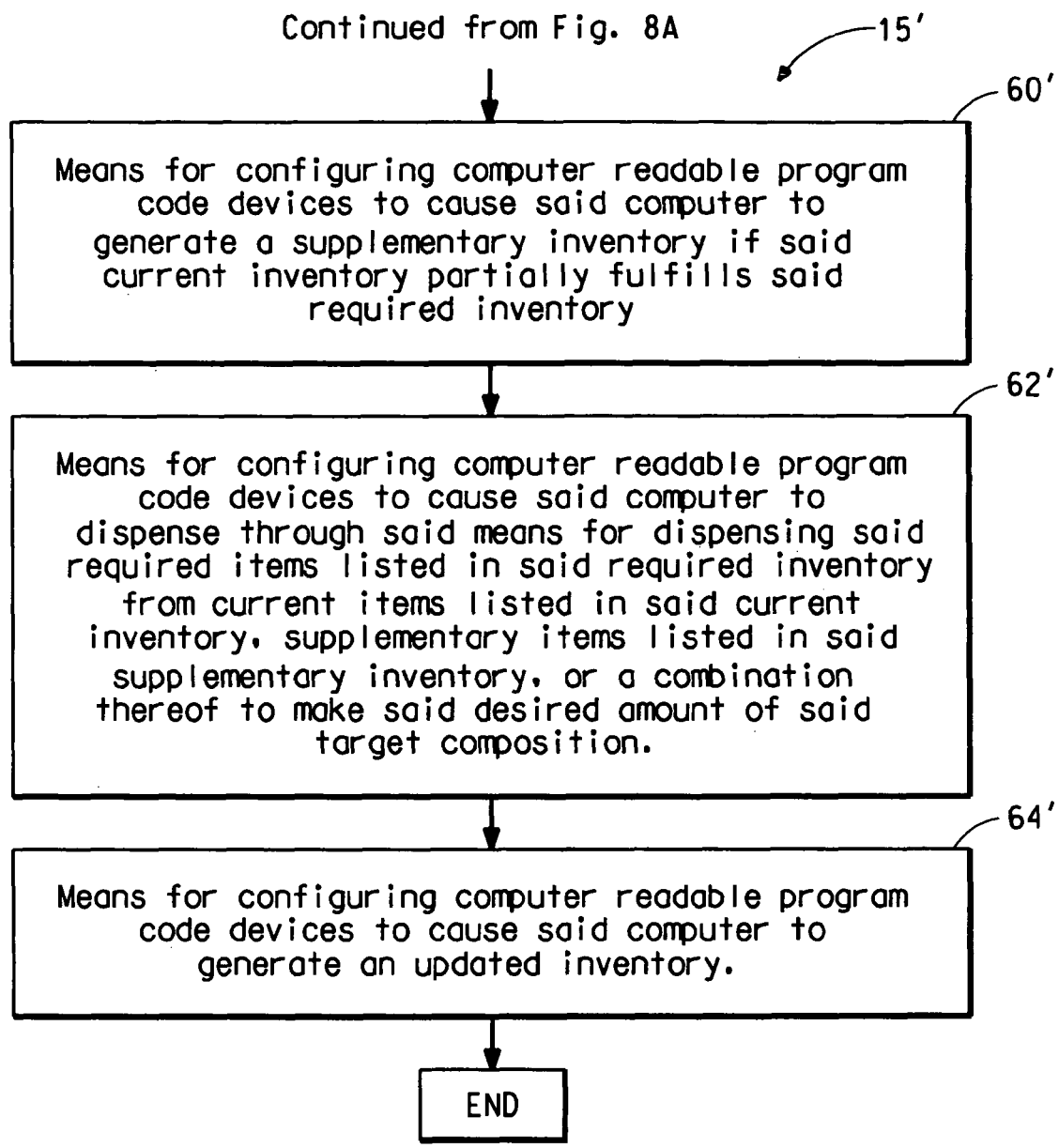

Relevant aspects of device 2, as shown in FIGS. 7, 8A and 8B include:

(A) a computer usable storage medium 16' located in a computer 10"; and (B) means 24' for dispensing required items for making a desired amount of the target composition, the means 24' for dispensing being in communication with the computer;

wherein the computer usable storage medium 16' has computer readable program code means 15' residing therein for monitoring production of a target composition, the computer readable program code means 15' comprising:

(I) Means 50' for configuring computer readable program code devices to cause the computer to identify one or more formulas associated with identification criteria of the target composition, the formula providing a required inventory for making the desired amount of the target composition.

(II) Means 52' for configuring computer readable program code devices to cause the computer to generate a current inventory. As shown in FIG. 8A and FIG. 9, means 52' of code means 15' include means 53' for configuring computer readable program code devices to cause computer 10" to receive (a) stock composition information on stock composition identification tags 30A read by one or more identification tag interrogators 32A, (b) stock component information on stock components identification tags 30B read by identification tag interrogators 32A, (c) additional stock composition information on additional stock composition identification tags 34B read by identification tag interrogators 32B, and (d) missing stock component information on missing stock components identification tags 34B read by the identification tag interrogators 32B.

(III) Means 54' for configuring computer readable program code devices to cause the computer to terminate production of the target composition if the current inventory does not match with a stored inventory.

(IV) Means 56' for configuring computer readable program code devices to cause the computer to continue production of the target composition if the current inventory matches with the stored inventory.

(V) Means 58' for configuring computer readable program code devices to cause the computer to compare the current inventory against the required inventory to ascertain whether said current inventory fulfills said required inventory.

(VI) Means 60' for configuring computer readable program code devices to cause the computer to generate a supplementary inventory if the current inventory partially fulfills the required inventory.

(VII) Means 62' for configuring computer readable program code devices to cause the computer to dispense through the means for dispensing the required items listed in the required inventory from current items listed in the current inventory, supplementary items listed in the supplementary inventory, or a combination thereof to make the desired amount of the target composition.

Figure 10:
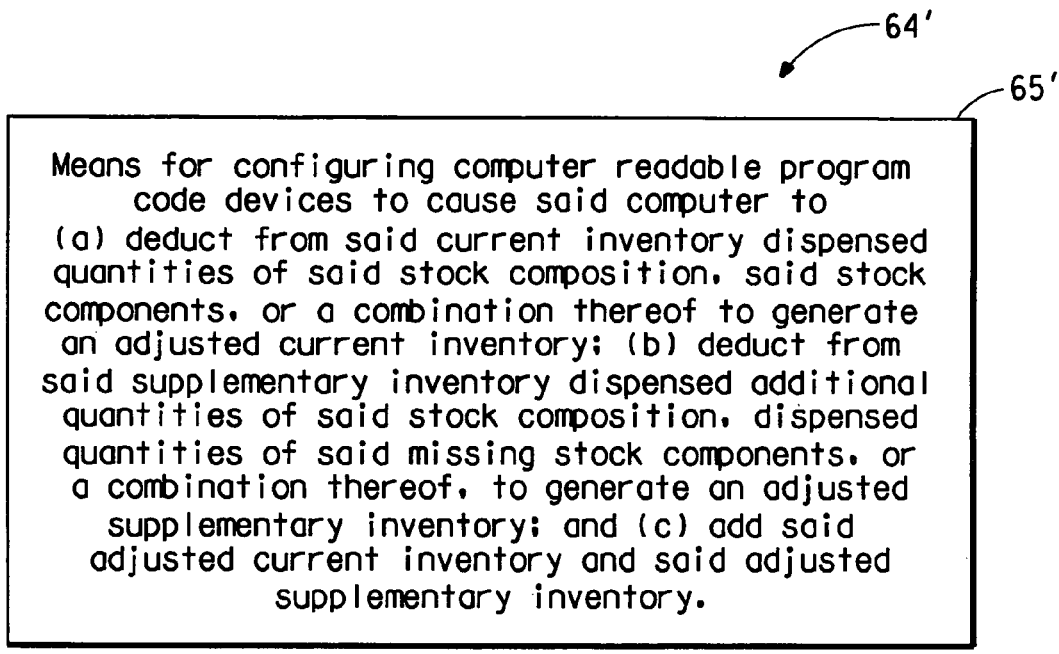
FIG. 10 provides further details of means for configuring computer readable program code devices to cause the computer to generate an updated inventory shown in FIG. 8B.

(VIII) Means 64' for configuring computer readable program code devices to cause the computer to generate an updated inventory. As shown in FIG. 8B and FIG. 10, means 64' of code means 15' include means 65' for configuring computer readable program code devices to cause computer 10" to (a) deduct from the current inventory dispensed quantities of the stock composition, the stock components, or a combination thereof to generate an adjusted current inventory; (b) deduct from the supplementary inventory dispensed additional quantities of the stock composition, dispensed quantities of the missing stock components, or a combination thereof, to generate an adjusted supplementary inventory; and (c) add the adjusted current inventory and the adjusted supplementary inventory.

Figure 11:
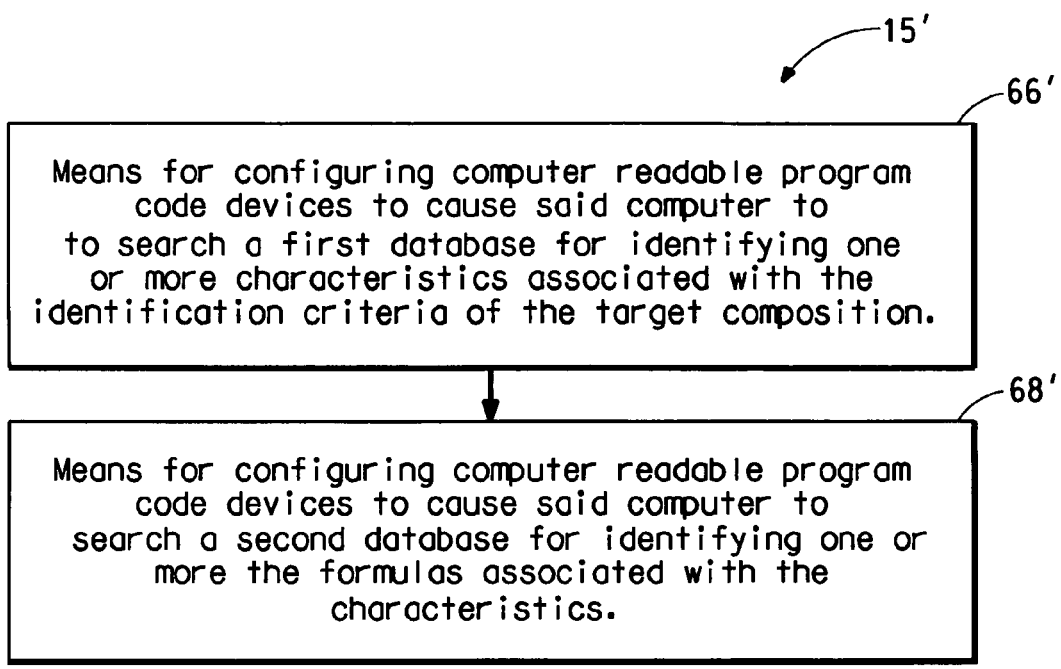
FIG. 11 represents a flowchart that further illustrates computer readable program code means used in the device of the present invention illustrated in FIG. 7.

As shown in FIG. 11, computer readable program code means 15' of device 2 also include:

(a) means 66' for configuring computer readable program code devices to cause computer 10" to search a first database for identifying one or more characteristics associated with the identification criteria of the target composition; and (b) means 68' for configuring computer readable program code devices to cause computer 10" to search a second database for identifying one or more the formulas associated with the characteristics.

The process and the device of the present invention helps in eliminating the dispensing of poor quality substitution of components listed in the formula, thereby preventing the production of sub-standard compositions. The integrity of the quality of the composition can be maintained by identifying each stock composition or stock component container with a unique identification number, which can be stored by a component manufacturer as soon as the contents in those containers are produced (becomes part of the stored inventory). As a result, the manufacturer can generate and maintain complete information, including the quantity contained in the containers. As the contents in the container are consumed, an updated inventory can be transmitted to the manufacturer by allowing the manufacturer access to client computer 10 or host computer 12, which can be alternatively operated by the manufacturer. The updated inventory then becomes the current inventory in the subsequent dispensing cycle provided the user, such as a collision repair shop, makes no unauthorized additions or deletions to the current inventory. Once the contents in a certain identified container are consumed or depleted, the code associated with that container is relegated to a dead-container list. If the user, by commission or omission attempts to use the same container by filling it with any other unrecognized component, the current inventory would fail to match with the stored inventory, thereby terminating the process. Thus, the process of the present invention helps in ensuring the product quality of the composition.

Additionally, since the manufacturer is aware of which component has been used up, the manufacturer can automatically augment the user with those depleted components without any formal request from the user, thereby reducing the time require to supply the components consumed by the user. Moreover, the manufacturer can also assist the user in reducing his inventory by supplying the components, just in time as they are used up. Moreover, the manufacturer can also bill the user on an "as-used-basis" for the cost of only the stock composition or components actually consumed. As a result, the user's out-of-pocket cost can be reduced. Finally, by using a transportable embodiment of the device of the present invention, the manufacturer could produce the composition at the user's place of business, thus further reducing the user's need to maintain an extensive and expensive inventory.

What is claimed is:

1. A monitoring device comprising:

(A) a client computer usable storage medium located in a client computer, and a host computer usable storage medium located in a host computer in communication with said client computer; and (B) means for dispensing required items for making a desired amount of said target composition, said means for dispensing being in communication with said client computer, said host computer, or said client and said host computer;

wherein said client computer usable storage medium, host computer usable storage medium, or said client computer usable storage and said host computer usable storage media have computer readable program code means residing therein for monitoring production of a target composition, said computer readable program code means comprising:

(I) means for configuring computer readable program code devices to cause said client computer or said host computer to identify one or more formulas associated with identification criteria of said target composition, said formula providing a required inventory for making said desired amount of said target composition, said required items in said required inventory comprising (a) one or more compositions matching characteristics and quantities thereof required to make said desired amount of said target composition; (b) target components and quantities thereof listed in said formula that are required to make said desired amount of said target composition; or (c) a combination of (a) and (b);

(II) means for configuring computer readable program code devices to cause said client computer or said host computer to generate a current inventory, wherein current items in said current inventory comprise (a) one or more stock compositions matching said characteristics and quantities thereof required to make said desired amount of said target composition; (b) stock components and quantities thereof listed in said formula that are required to make said desired amount of said target composition; or (c) a combination of (a) and (b);

(III) means for configuring computer readable program code devices to cause said client computer or said host computer to terminate production of said target composition if said current inventory does not match with a stored inventory when said current inventory does not meet the quality requirement listed in said formula or when said current inventory is in dead containers;

(IV) means for configuring computer readable program code devices to cause said client computer or said host computer to continue production of said target composition if said current inventory matches with said stored inventory;

(V) means for configuring computer readable program code devices to cause said client computer or said host computer to compare said current inventory against said required inventory to ascertain whether said current inventory fulfills said required inventory;

(VI) means for configuring computer readable program code devices to cause said client computer or said host computer to generate a supplementary inventory if said current inventory partially fulfills said required inventory wherein supplementary items in said supplementary inventory comprise (a) additional quantities of said stock compositions required to produce said desired amount of said target composition, (b) any missing stock components that match said target components listed in said formula in sufficient quantities required to produce said desired amount of said target composition, or (c) a combination of (a) and (b);

(VII) means for configuring computer readable program code devices to cause said client computer or said host computer to dispense through said means for dispensing said required items listed in said required inventory, from said current items listed in said current inventory, supplementary items listed in said supplementary inventory, or a combination thereof to make said desired amount of said target composition; and (VIII) means for configuring computer readable program code devices to cause said client computer or said host computer to generate an updated inventory.

2. The device of claim 1 wherein said computer readable program code means comprise:

(a) means for configuring computer readable program code devices to cause said client computer or said host computer to search a first database for identifying one or more characteristics associated with said identification criteria of said target composition; and (b) means for configuring computer readable program code devices to cause said client computer or said host computer to search a second database for identifying one or more said formulas associated with said characteristics.

3. The device of claim 2 wherein said first database resides on said client computer and said second database resides on said host computer, said first and said second database reside on said host computer in communication with said client computer, or said first and said second database reside on said client computer.

4. The device of claim 1 wherein said identification criteria comprise one or more of a manufacturer name, make, model, year of production, color name, paint code, cross reference information, intended use, VIN number, or spectrophotometric data of a vehicle or its color.

5. The device of claim 1 wherein said means (II) comprise means for configuring computer readable program code devices to cause said client computer or said host computer to receive:

(a) stock composition information on stock composition identification tags read by one or more identification tag interrogators, said stock composition identification tags being affixed to stock composition containers that contain said stock composition, ( b) stock component information on stock components identification tags read by said identification tag interrogators, said stock components identification tags being affixed to stock component containers that match said target components, (c) additional stock composition information on additional stock composition identification tags read by said identification tag interrogators, said additional stock composition identification tags being affixed to additional stock composition containers that contain said stock composition, and (d) missing stock component information on said missing stock components identification tags read by said identification tag interrogators, said missing stock components identification tags being affixed to missing stock component containers.

6. The device of claim 5 wherein said stock composition containers, said stock component containers, said additional stock composition containers, said missing stock component containers, or a combination thereof are positioned in one or more stock racks of said device.

7. The device of claim 5 wherein said stock composition identification tags, stock component identification tags, additional stock composition identification tags and said missing stock components identification tags are RFID tags, bar code tags or a combination thereof.

8. The device of claim 5 wherein said wherein said stock composition identification tags, stock component identification tags, additional stock composition identification tags and said missing stock components identification tags are passive or active RFID tags.

9. The device of claim 5 wherein said identification tag interrogator is a RFID tag interrogator.

10. The device of claim 1 said means (VIII) comprise means for configuring computer readable program code devices to cause said client computer or said host computer to:

(a) deduct from said current inventory dispensed quantities of said stock composition, said stock components, or a combination thereof to generate an adjusted current inventory;

(b) deduct from said supplementary inventory dispensed additional quantities of said stock composition, dispensed quantities of said missing stock components, or a combination thereof, to generate an adjusted supplementary inventory; and (c) add said adjusted current inventory and said adjusted supplementary inventory.

11. The device of claim 1 or 10 wherein said means for dispensing required items comprise one more dispenser nozzles for dispensing said required items in an identified target composition receiver.

12. The device of claim 11 wherein said means for dispensing comprise means for conveying said required items to said dispenser nozzles from said stock composition containers, said stock component containers, said additional stock composition containers, said missing stock component containers, or a combination thereof.

13. The device of claim 11 said identified target composition receiver is provided with a target composition identification tag.

14. The device of claim 13 wherein said target composition identification tag is a RFID tag, a bar code tag or a combination thereof.

15. The device of claim 14 comprising an identification tag interrogator for writing to said target composition identification tag target composition information.

16. The device of claim 1 wherein said required inventory, said current inventory, said supplementary inventory, and said updated inventory are stored on a client computer, on a host computer in communication with said client computer, or on said client computer and said host computer.

17. The device of claim 16 comprising:

(a) means for weighing said required items in said identified target composition receiver, (b) means for generating a signal upon completion of dispensing said required items in accordance with said required inventory, and (c) means for transmitting said signal to said client computer, said host computer, said means for dispensing, or a combination thereof.

18. The device of claim 1 wherein said device is a transportable device.

19. A monitoring device comprising:

(A) a computer usable storage medium located in a computer; and (B) means for dispensing required items for making a desired amount of said target composition, said means for dispensing being in communication with said computer;

wherein said computer usable storage medium has computer readable program code means residing therein for monitoring production of a target composition, said computer readable program code means comprising:

(I) means for configuring computer readable program code devices to cause said computer to identify one or more formulas associated with identification criteria of said target composition, said formula providing a required inventory for making said desired amount of said target composition, said required items in said required inventory comprising (a) one or more compositions matching characteristics and quantities thereof required to make said desired amount of said target composition; (b) target components and quantities thereof listed in said formula that are required to make said desired amount of said target composition; or (c) a combination of (a) and (b);

(II) means for configuring computer readable program code devices to cause said computer to generate a current inventory, wherein current items in said current inventory comprise (a) one or more stock compositions matching said characteristics and quantities thereof required to make said desired amount of said target composition; (b) stock components and quantities thereof listed in said formula that are required to make said desired amount of said target composition; or (c) a combination of (a) and (b);

(III) means for configuring computer readable program code devices to cause said computer to terminate production of said target composition if said current inventory does not match with a stored inventory when said current inventory does not meet the quality requirement listed in said formula or when said current inventory is in dead containers;

(IV) means for configuring computer readable program code devices to cause said computer to continue production of said target composition if said current inventory matches with said stored inventory;

(V) means for configuring computer readable program code devices to cause said computer to compare said current inventory against said required inventory to ascertain whether said current inventory fulfills said required inventory;

(VI) means for configuring computer readable program code devices to cause said computer to generate a supplementary inventory if said current inventory partially fulfills said required inventory wherein supplementary items in said supplementary inventory comprise (a) additional quantities of said stock compositions required to produce said desired amount of said target composition, (b) any missing stock components that match said target components listed in said formula in sufficient quantities required to produce said desired amount of said target composition, or (c) a combination of (a) and (b);

(VII) means for configuring computer readable program code devices to cause said computer to dispense through said means for dispensing said required items listed in said required inventory, from said current items listed in said current inventory, supplementary items listed in said supplementary inventory, or a combination thereof to make said desired amount of said target composition; and (VIII) means for configuring computer readable program code devices to cause said computer to generate an updated inventory.

\* \* \* \* \*